(12) United States Patent
Cady (10) Patent No.: US 9,879,914 B2
(45) Date of Patent: *Jan. 30, 2018

(54) INJECTING GAS INTO A VESSEL (71) Applicant: Technological Resources Pty. Limited, Melbourne, Victoria (AU)

(72) Inventor: Barry Alan Cady, Chelsea (AU)

(73) Assignee: Technological Resources Pty. Limited, Melbourne (AU)

( * ) Notice: Subject to any disclaimer, the term of this patent is extended or adjusted under 35 U.S.C. 154(b) by 0 days.

This patent is subject to a terminal disclaimer.

(21) Appl. No.: 14/860,950

(22) Filed: Sep. 22, 2015

(65) Prior Publication Data
US 2016/0010922 A1    Jan. 14, 2016

Related U.S. Application Data (63) Continuation of application No. 13/139,123, filed as application No. PCT/AU2009/001607 on Dec. 11, 2009, now Pat. No. 9,222,144.

(30) Foreign Application Priority Data

Dec. 11, 2008    (AU) .................. 2008906396

(51) Int. Cl.
F27D 3/16    (2006.01)
C21C 5/46    (2006.01)
C21C 5/52    (2006.01)

(52) U.S. Cl.
CPC .............. F27D 3/16 (2013.01); C21C 5/4606 (2013.01); C21C 5/5217 (2013.01);
(Continued)

(58) Field of Classification Search
CPC .................. C21C 5/4606; C21C 5/5217; F27D 2003/167; F27D 2003/169; F27D 3/16; Y02P 10/216
(Continued)

(56) References Cited

U.S. PATENT DOCUMENTS 6,440,356 B2    8/2002    Dunne
6,673,305 B2    1/2004    Dunne et al.
(Continued)

FOREIGN PATENT DOCUMENTS

CN    1995708    7/2007
CN    101294771    10/2008
(Continued)

OTHER PUBLICATIONS

International Search Report from Australian Patent Office for International Application No. PCT/AU2009/001607, dated Feb. 23, 2010.

*Primary Examiner* — Scott Kastler
*Assistant Examiner* — Michael Aboagye
(74) *Attorney, Agent, or Firm* — Banner & Witcoff, Ltd.

(57) ABSTRACT

An apparatus for injecting gas into a vessel is disclosed. The apparatus comprises a gas flow duct from which to discharge gas from the duct, an elongate central structure extending within the gas flow duct, and a plurality of flow directing vanes disposed about the central structure adjacent the forward end of the duct to impart swirl to a gas flow through the forward end of the duct. The apparatus also comprises cooling water flow passages in the vanes that have inlets at the forward ends of the vanes and outlets at the rear ends of the vanes.

10 Claims, 5 Drawing Sheets

(52) U.S. Cl.
CPC .. *F27D 2003/167* (2013.01); *F27D 2003/169* (2013.01); *Y02P 10/216* (2015.11)

(58) Field of Classification Search
USPC ......... 266/46, 225, 241, 265, 266, 268, 270, 266/217, 240, 271, 216, 267
See application file for complete search history.

(56) References Cited

U.S. PATENT DOCUMENTS

| | | | |
|---|---|---|---|
| 6,939,391 B2* | 9/2005 | Dry | C21B 13/0013 266/225 |
| 7,296,973 B2 | 11/2007 | Lee et al. | |
| 7,481,965 B2 | 1/2009 | Williams et al. | |
| 7,568,681 B2 | 8/2009 | Tierney et al. | |
| 7,588,718 B2 | 9/2009 | Williams et al. | |
| 8,017,068 B2 | 9/2011 | Dengel et al. | |
| 8,936,749 B2 | 1/2015 | Cady | |
| 9,222,144 B2* | 12/2015 | Cady | C21C 5/4606 |
| 2001/0033046 A1 | 10/2001 | Dunne | |
| 2002/0050097 A1 | 5/2002 | Fournier et al. | |
| 2003/0011114 A1 | 1/2003 | Dunne et al. | |
| 2007/0246869 A1 | 10/2007 | Rymarchyk et al. | |
| 2008/0128963 A1 | 6/2008 | Cingle et al. | |
| 2008/0265473 A1* | 10/2008 | Dengel | C21C 5/4606 266/225 |

FOREIGN PATENT DOCUMENTS

| | | |
|---|---|---|
| EP | 1939306 | 7/2008 |
| EP | 1942200 | 7/2008 |
| WO | 03006693 | 1/2003 |

\* cited by examiner

INJECTING GAS INTO A VESSEL

CROSS REFERENCE TO RELATED APPLICATION

This application is a continuation of U.S. Ser. No. 13/139,123, filed Jun. 10, 2011, now U.S. Pat. No. 9,222,144, which is a national phase application based on PCT/AU2009/001607, filed Dec. 11, 2009, which claims the priority of Australian Patent Application No. 2008906396, filed Dec. 11, 2008, the contents of which are incorporated herein by reference in their entireties.

FIELD OF THE INVENTION

The present invention relates to an apparatus for injecting gas into a vessel. It has particular, but not exclusive application to apparatus for injecting a flow of gas into a metallurgical vessel under high temperature conditions. Such metallurgical vessel may for example be a smelting vessel in which molten metal is produced by a direct smelting process.

A known direct smelting process, which relies on a molten metal layer as a reaction medium, and is generally referred to as the HIsmelt process, is described in U.S. Pat. Nos. 6,440,356 and 6,673,305.

The HIsmelt process comprises:
(a) forming a bath of molten metal in the form of iron and slag in a vessel;
(b) injecting into the bath:
  (i) a metalliferous feed material, typically metal oxides; and
  (ii) a solid carbonaceous material, typically coal, which acts as a reductant of the metal oxides and a source of energy; and
(c) smelting metalliferous feed material to metal in the metal layer.

The term "smelting" is herein understood to mean thermal processing wherein chemical reactions that reduce metal oxides take place to produce liquid metal.

The HIsmelt process also comprises post-combusting reaction gases, such as CO and $H_2$ released from the bath in the space above the bath with oxygen-containing gas and transferring the heat generated by the post-combustion to the bath to contribute to the thermal energy required to smelt the metalliferous feed materials.

The HIsmelt process also comprises forming a transition zone above the nominal quiescent surface of the bath in which there is a favourable mass of ascending and thereafter descending droplets or splashes or streams of molten metal and/or slag which provide an effective medium to transfer to the bath the thermal energy generated by post-combusting reaction gases above the bath.

In the HIsmelt process the metalliferous feed material and solid carbonaceous material is injected into the metal layer through a number of lances/tuyeres which are inclined to the vertical so as to extend downwardly and inwardly through the side wall of the smelting vessel and into the lower region of the vessel so as to deliver the solids material into the metal layer in the bottom of the vessel. To promote the post combustion of reaction gases in the upper part of the vessel, a blast of hot air, which may be oxygen enriched, is injected into the upper region of the vessel through the downwardly extending hot air injection lance. To promote effective post combustion of the gases in the upper part of the vessel, it is desirable that the incoming hot air blast exit the lance with a swirling motion. To achieve this, the outlet end of the lance may be fitted with internal flow guides to impart an appropriate swirling motion. The upper regions of the vessel may reach temperatures of the order of 2000° C. and the hot air may be delivered into the lance at temperatures of the order of 1100-1400° C. The lance must therefore be capable of withstanding extremely high temperatures both internally and on the external walls, particularly at the delivery end of the lance which projects into the combustion zone of the vessel. The flow guides in particular are prone to failure due to the high temperatures to which they are exposed and due to impact with grit and other particulate contaminants carried in the gas blast from the gas heating stoves.

The present invention facilitates the provision of robust, internally cooled flow guides able to withstand these severe operating conditions.

SUMMARY OF THE INVENTION

According to the invention, there is provided an apparatus for injecting gas into a vessel, comprising:
  a gas flow duct extending from a rear end to a forward end from which to discharge gas from the duct;
  an elongate central structure extending within the gas flow duct from its rear end to its forward end;
  a plurality of flow directing vanes disposed about the central structure adjacent the forward end of the duct to impart swirl to a gas flow through the forward end of the duct, the forward end of the central structure and the forward end of the duct co-acting together to form an annular nozzle for flow of gas from the duct with swirl imparted by the vanes;
  cooling water flow passages within the vanes for flow of cooling water therein to cool the vanes; and
  cooling water supply passage means and return passage means within the central structure for supply of cooling water from the rear end of the central structure to the water flow passages in the vanes and return of the cooling water from the flow passages in the vanes to the rear end of the central structure;
    wherein the water flow passages in the vanes have inlets communicating with the cooling water supply passage means in the central structure at the forward ends of the vanes and outlets communicating with the return flow passage means in the central structure at the rear ends of the vanes.

The cooling water flow passages in the vanes may extend between their inlets and outlets in serpentine paths that define multiple passes between the front and rear ends of the vanes.

The cooling water flow passages in the vanes may extend from their inlets backwardly along outer parts of the vanes.

More specifically, the cooling water flow passages in the vanes may extend from their inlets backwardly along outer parts of the vanes to the rear end of the vanes then forwardly to the forward ends of the vanes and thence along inner parts of the vanes to their outlets.

The vanes may have hollow interiors divided by interior baffles to form the cooling water flow passages therein.

More particularly, the vanes may have spaced apart side walls and the baffles may be elongate bars extending along the vanes between their forward and rear ends and dividing the interior of the vanes between the side walls to form the cooling water flow passages.

The outer edges of the vanes may be formed by capping bars connected between the side walls.

The side walls of the vanes may be steel plates.

The vanes may be of spiraling multi-start formation.

The vanes form part of a vaned structure comprising the vanes and a tubular hub mounted on the central structure.

The invention also extends to a vaned structure to impose swirl to a gas flow, comprising a tubular hub and a plurality of vanes extending along the hub in a multi-start spiraling formation, wherein the vanes are formed with internal cooling water flow passages extending between inlets forward one end of the hub and outlets toward the other end of the hub.

The inlets and outlets may be provided by slots extending radially through the hub.

In order that the invention may be more fully explained, one particular embodiment will now be described in detail with reference to the accompanying drawings.

DETAILED DESCRIPTION OF THE PREFERRED EMBODIMENT

Figure 1:
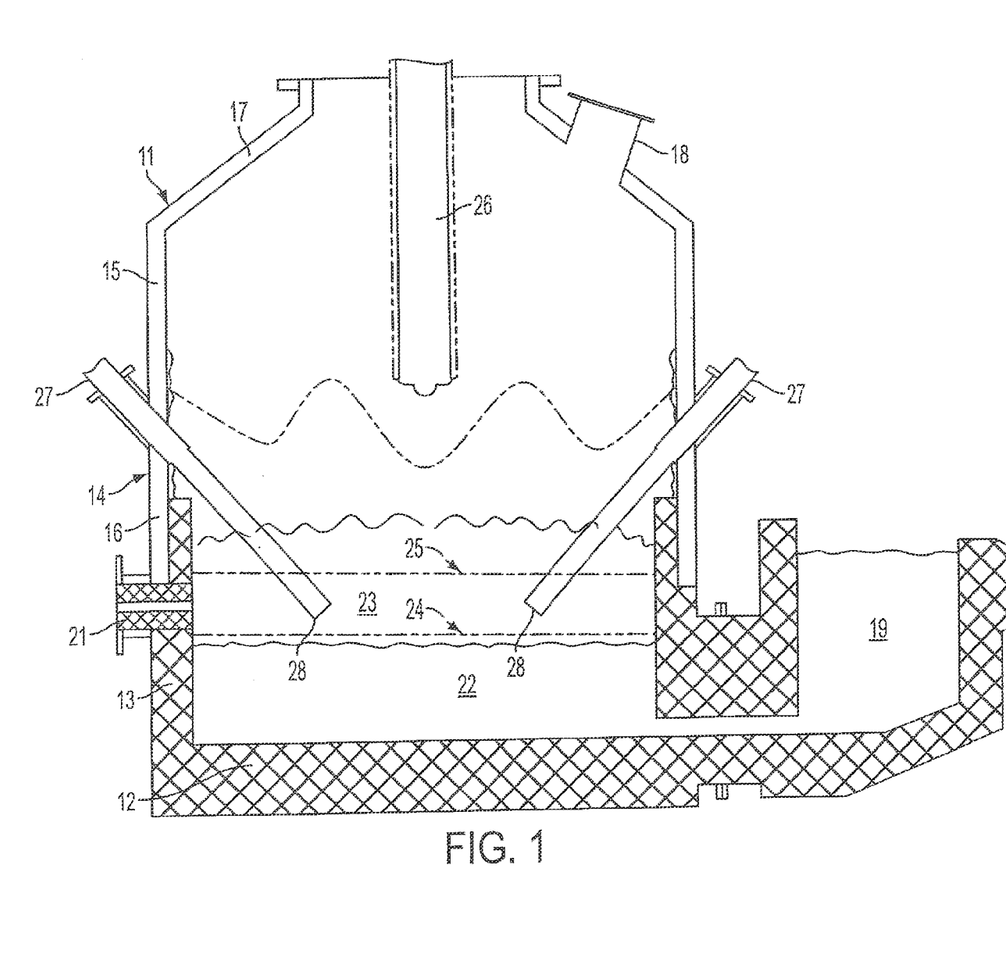
FIG. 1 is a vertical section through one embodiment of a direct smelting vessel incorporating a pair of solids injection lances and a hot air blast injection lance constructed in accordance with the invention.

FIG. 1 illustrates a direct smelting vessel suitable for operation by the HIsmelt process as described in U.S. Pat. Nos. 6,440,356 and 6,673,305. The metallurgical vessel is denoted generally as 11 and has a hearth that includes a base 12 and sides 13 formed from refractory bricks; side walls 14 which form a generally cylindrical barrel extending upwardly from the sides 13 of the hearth and which includes an upper barrel section 15 and a lower barrel section 16; a roof 17; an outlet 18 for off-gases; a forehearth 19 for discharging molten metal continuously; and a tap-hole 21 for discharging molten slag.

In use, the vessel contains a molten bath of iron and slag which includes a layer 22 of molten metal and a layer 23 of molten slag on the metal layer 22. The arrow marked by the numeral 24 indicates the position of the nominal quiescent surface of the metal layer 22 and the arrow marked by the numeral 25 indicates the position of the nominal quiescent surface of the slag layer 23. The term "quiescent surface" is understood to mean the surface when there is no injection of gas and solids into the vessel.

The vessel is fitted with a downwardly extending hot air injection lance 26 for delivering a hot air blast into an upper region of the vessel and two solids injection lances 27 extending downwardly and inwardly through the side walls 14 and into the slag layer 23 for injecting iron ore, solid carbonaceous material, and fluxes entrained in an oxygen-deficient carrier gas into the metal layer 22. The position of the lances 27 is selected so that their outlet ends 28 are above the surface of the metal layer 22 during operation of the process. This position of the lances reduces the risk of damage through contact with molten metal and also makes it possible to cool the lances by forced internal water cooling without significant risk of water coming into contact with the molten metal in the vessel.

The construction of the hot air injection lance 26 is illustrated in FIGS. 2-11. As shown in these figures lance 26 comprises an elongate duct 31 which receives hot gas through a gas inlet structure 32 and injects it into the upper region of vessel. The lance includes an elongate central tubular structure 33 which extends within the gas flow duct 31 from its rear end to its forward end. Adjacent the forward end of the duct, central structure 33 carries a series of four swirl imparting vanes 34 for imparting swirl to the gas flow exiting the duct. The forward end of central structure 33 has a domed nose 35 which projects forwardly beyond the tip 36 of duct 31 so that the forward end of the central structure 33 and the forward end of the duct co-act together to form an annular nozzle for divergent flow of gas from the duct with swirl imparted by the vanes 34. Vanes 34 form part of a structure 40 comprising a tubular hub 40A about which the vanes 34 are disposed in a four-start helical formation and are a sliding fit within the forward end of the duct.

Figure 2:
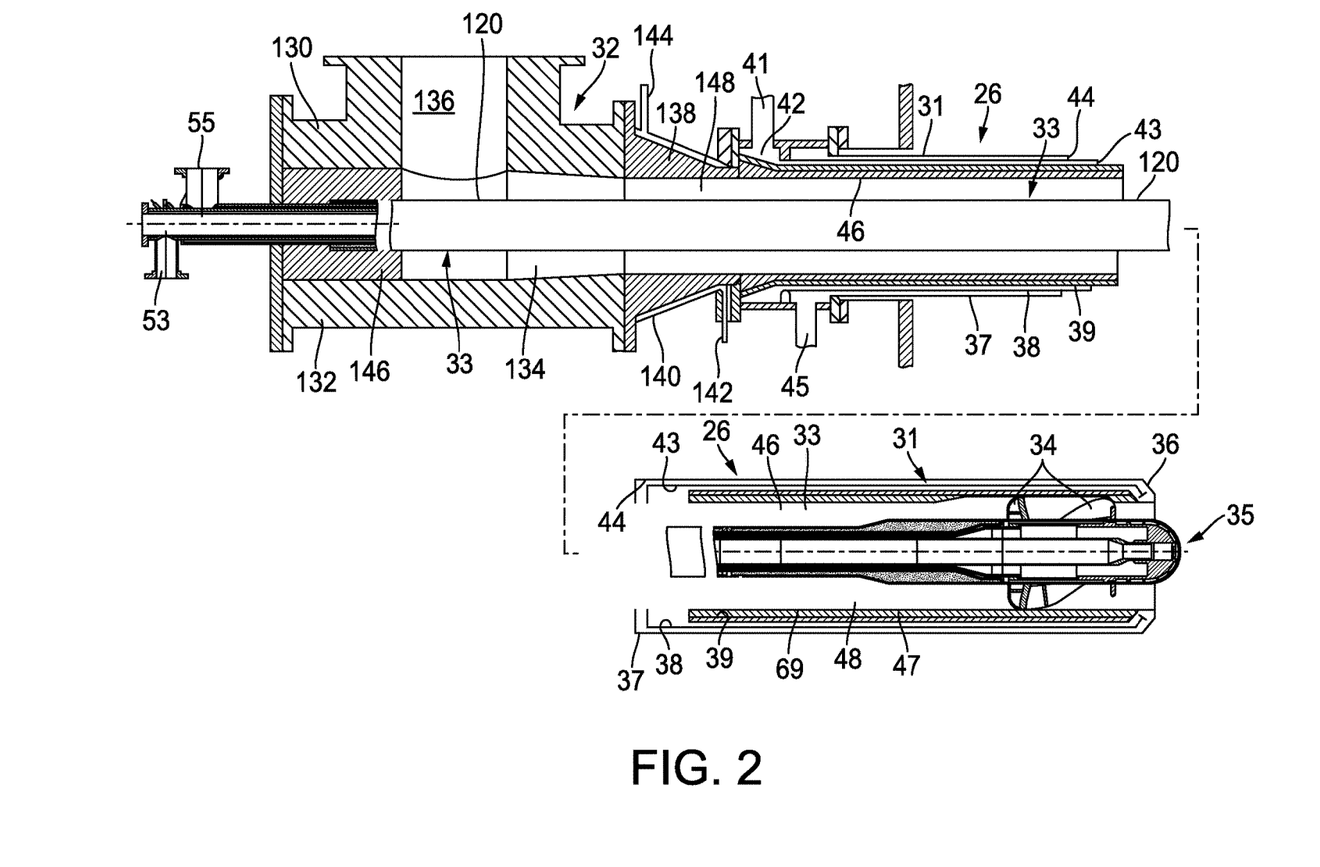
FIG. 2 is a longitudinal cross-section through the hot air blast injection lance.

The wall of the main part of duct 31 extending downstream from the gas inlet 32 is internally water cooled. This section of the duct is comprised of a series of three concentric steel tubes 37, 38, 39 extending to the forward end part of the duct where they are connected to the duct tip 36. The duct tip 36 is of hollow annular formation and it is internally water cooled by cooling water supplied and returned through passages in the wall of duct 31. Specifically, cooling water is supplied through an inlet 41 and annular inlet manifold 42 into an inner annular water flow passage 43 defined between the tubes 38, 39 of the duct through to the hollow interior of the duct tip 36 through circumferentially spaced openings in the tip. Water is returned from the tip through circumferentially spaced openings into an outer annular water return flow passage 44 defined between the tubes 37, 38 and backwardly to a water outlet 45 at the rear end of the water cooled section of duct 31.

The water cooled section of duct 31 is internally lined with an internal refractory lining 46 that fits within the innermost metal tube 39 of the duct and extends through to the water cooled tip 36 of the duct. The inner periphery of duct tip 36 is generally flush with the inner surface of the refractory lining which defines the effective flow passage for gas through the duct. The forward end of the refractory lining has a slightly reduced diameter section 47 which receives the swirl vanes 34 with a snug sliding fit. Rearwardly from section 47 the refractory lining is of slightly greater diameter to enable the central structure 33 to be inserted downwardly through the duct on assembly of the lance until the swirl vanes 34 reach the forward end of the duct where they are guided into snug engagement with refractory section 47 by a tapered refractory land 48 which locates and guides the vanes into the refractory section 47.

The hollow interior of duct tip 36 may be divided internally so as to form cooling water flow galleries (not shown) extending circumferentially around the tip in the manner which is more fully disclosed in United States Patent Publication 2006-0108722-A1.

Turning to FIG. 2, gas inlet 31 has a T-shaped body 130 located within a thin walled outer metal shell 132. Body 130 defines a first tubular passage 134 aligned with the central passage of duct 31 and a second tubular passage 136 normal to passage 134 to receive the hot airflow. Passage 134 is aligned with the gas flow passage of duct 31 and is connected to it through a central passage 148 in a connecting piece 138 of inlet 32. The hot air is delivered to inlet 32 passes through tubular passage 136 of body 130 and impinges on the wall of the body 130. The gas flow then changes direction to flow at right angles down through passage 134 of the T-shaped body 130 and the central passage 148 of transition piece 138 and into the main part of the duct. The body is water cooled through an annular cooling water jacket 140 through which cooling water is circulated through an inlet 142 and an outlet 144. The rear end of central structure 33 extends through the tubular passage 134 of gas inlet 32 and is located within a plug 146 which closes the rear end of passage 134, the rear end of central structure 33 extending back from gas inlet 32 to the water flow inlet 53 and outlet 55.

As is to be described in detail with reference to FIGS. 8 to 11 the swirl vanes 34 are formed with internal cooling water flow passages. The vanes 34 and the front end of central structure 33 are internally water cooled by cooling water supplied forwardly through the central structure from the rear end to the forward end of the lance and then returned back along the central structure to the rear end of the lance. Separate water supply passages extend through the central structure for supply of cooling water to the vanes and to the domed nose 35 so as to enable a strong flow of cooling water directly to the vanes and to the domed nose 35 in particular which are subjected to very high heat flux in operation of the lance.

Figure 3:
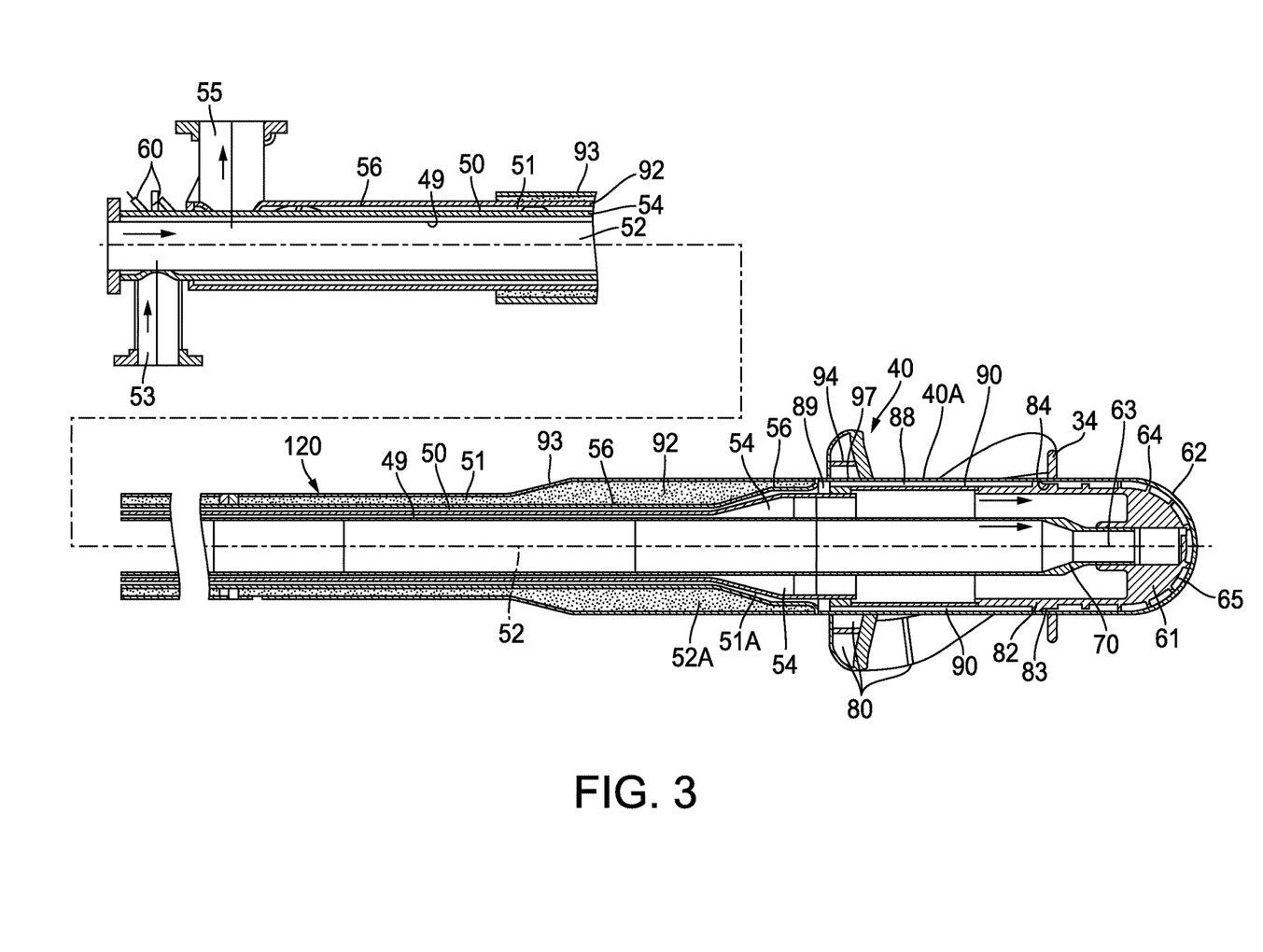
FIG. 3 is a longitudinal cross-section through a central structure of the lance.

Central structure 33 comprises a series of three concentric steel tubes 49, 50, 51 formed by tube segments disposed end to end and welded together. Inner tube 49 defines a central first water flow passage 52 through which water flows forwardly through the central structure from a water inlet 53 at the rear end of the lance through to the front end nose 35 of the central structure. A second water supply passage 54 is formed by the annular space between the inner tube 49 and the intermediate tube 50 through which water can flow through the central structure from a water inlet 60 at the rear end of the lance to internal cooling water flow passages in the swirl vanes 34.

The annular space between the intermediate tube 50 and the outer tube 51 provides a water return passage 56 through which cooling water returns from both the nose 35 of the central structure 33 and the cooling water flow passages in the vanes back through the central structure to a water outlet 55 at the rear end of the lance.

Figure 4:
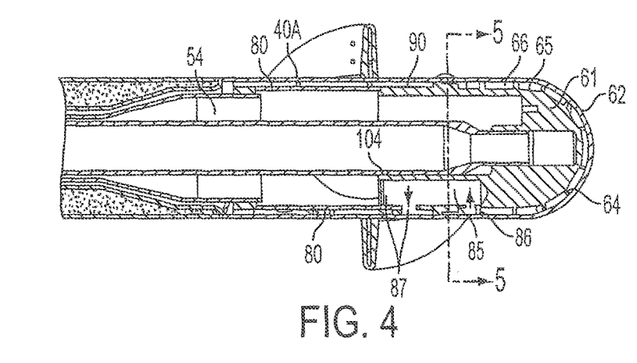
FIG. 4 is a longitudinal cross-section through a forward part of the central structure.
Figure 5:
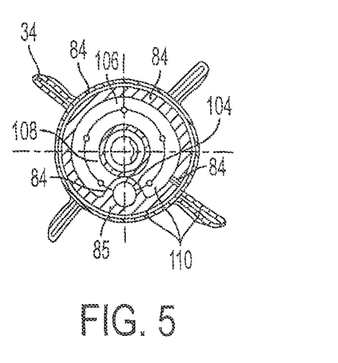
FIG. 5 is a transverse cross-section on the line 5-5 in FIG. 4.
Figure 6:
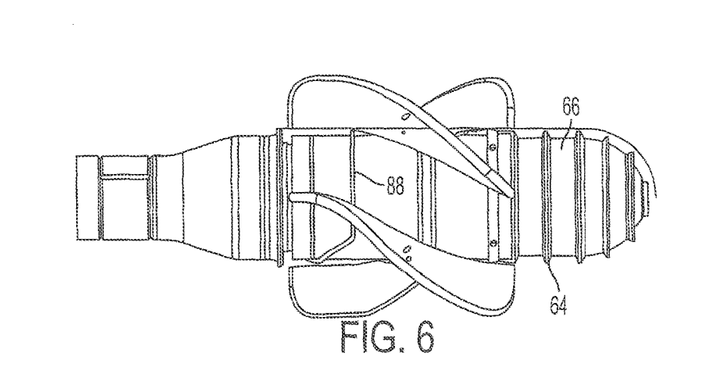
FIGS. 6 and 7 are side elevations that show the forward part of the central structure with some parts removed for clarity.
Figure 7:
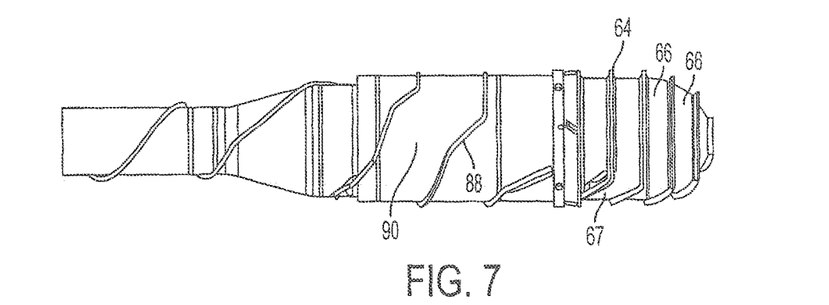
Figure 8:
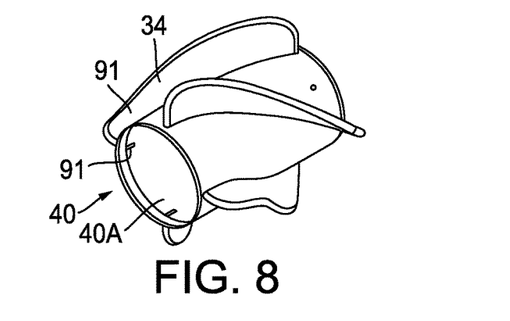
FIGS. 8 is a perspective view of a swirl vane structure mounted on the forward end of the central structure.
Figure 9:
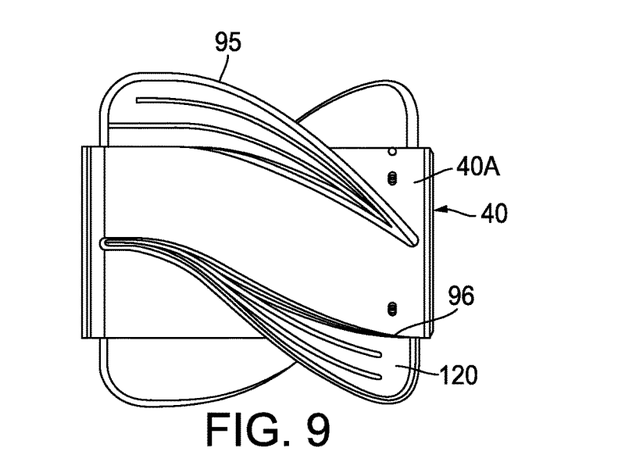
FIG. 9 is a side elevation of the swirl vane structure.
Figure 10:
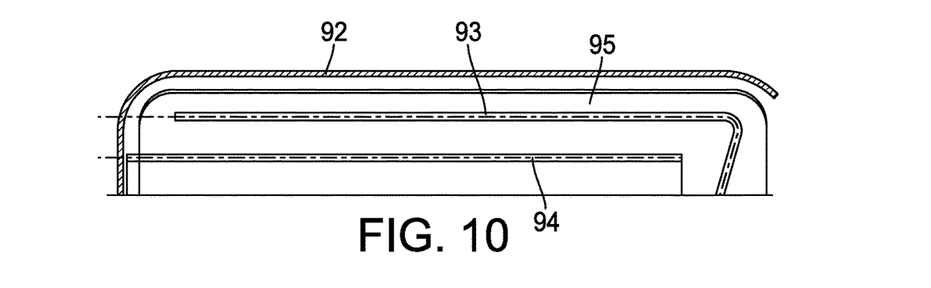
FIG. 10 is a development of one of the swirl vanes in the structure shown in FIGS. 8 and 9.
Figure 11:
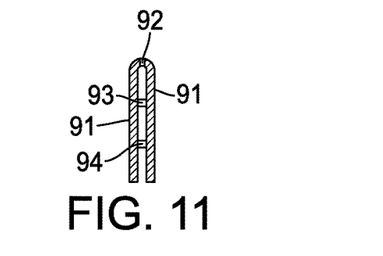
FIG. 11 is a transverse cross-section through one of the swirl vanes.

Toward the front end of the central structure 33 the intermediate tube 50 and outer tube 51 flare outwardly at 51A, 52A so that the inner end of the second water supply passage 54 is enlarged. Intermediate tube 51A is extended by an extension tube 80 which is connected to a tubular rear part of a copper body 61 fitted within an outer domed nose shell 62 also formed of copper forming the nose end of central structure 33.

The tubular hub 40A of vane structures fits around the rear end of body 61 and the extension tube 80 immediately behind the nose shell 62. The forward end of vane hub 40A fits onto a circumferential rib 82 formed on the tubular part of copper body 61 and provided with an annular groove 83 which receives water through four circumferentially spaced slots 84 through the tubular part of copper body 61 to serve as a water inlet gallery for supply of cooling water from the expanded inner end of cooling water passage 54 to the cooling water passages in the vanes in the manner to be described below.

Behind rib 82 there is an annular clearance space 90 between the hub 40A of the vane structure and the extension tube 80 and tubular part of copper body 61 which provides an extension of a water flow passage through the front end of the central structure in the manner now to be described.

The inner copper piece 61 of the nose end of the central structure is formed with a central water flow passage 63 connecting through a connector tube 70 with the inner end of central water supply passage 52 to receive water from the duct 52 and direct it to the tip of the nose. Nose piece 61 is formed with projecting ribs 64 which fit snugly within the nose shell 62 to define a single continuous cooling water flow passage 65 between the inner section 61 and the outer nose shell 62. The ribs 64 are shaped so that the single continuous passage 65 extends as annular passage segments 66 interconnected by passage segments 67 sloping from one annular segment to the next. Thus passage 65 extends from the tip of the nose in a spiral which, although not of regular helical formation, does spiral around and back along the nose.

The rear end of copper piece 61 is formed with an integral cylindrical boss 104 within which there extends a short longitudinal passage 85 connected at its forward end with the rear end of the nose cooling water passage 65 through a port 86 and at its rear end through a port 87 with the annular space 90 within the vane structure hub 40A. In effect, this arrangement forms an inward lateral step in the flow passage. Cooling water from passage 65 can thus flow via port 86, passage 85 and port 87 into the annular space 90, so bypassing the outward flow of cooling water to the vanes via the circumferentially spaced slots 84 and the groove 83 in rib 82. More particularly, the cylindrical boss 104 extends through what would have been an annular forward end portion of the second cooling water supply passage 54, with the result that the forward end is an arcuate section 106 as viewed in FIG. 5. This arcuate section 106 has first and second end portions 108, 110 separated by the cylindrical boss 104. It can be appreciated from FIG. 5 that the arrangement does not restrict water flow from the forward end of the second cooling water supply passage 54 into the slots 84 that communicate with the annular groove 83 and the cooling water passages in the vanes in the manner to be described below. Annular space 90 is divided by an elongate baffle bar 88 to form a spiraled extension of the cooling water passage 65 extending around the front end of the inner structure immediately within the vaned structure 40 and back to an annular water outlet gallery 89 which connects with the water return passage 56 of the central structure. The water passage 65 and the spiraled extension within the annular space 90 thus form a continuous cooling water flow passage in the forward end of the central structure which extends backwardly from the nose and within the outer periphery of that part of the central structure on which the vanes are mounted so assisting in the cooling of the vane structure, the diversion through passage 85 enabling this passage to bypass the outward flow of cooling water to the vanes.

The forced flow of cooling water in a single coherent stream through spiral passage 65 extending around and back along the nose end 35 of central structure ensures efficient heat extraction and avoids the development of "hot spots" on the nose which could occur if the cooling water is allowed to divide into separate streams at the nose. In the illustrated arrangement the cooling water is constrained in a single stream from the time that it enters the nose end 35 to the time that it exits the nose end.

The construction of vane structure 40 is illustrated in FIGS. 8 to 11. Each vane is formed by a pair of stainless steel side plates 91 which spiral along hub 40A in the front to rear direction and are separated by a capping bar 92 extended around the outer rim of the vane and a pair of baffle bars 93, 94 which divide the interior of the vane between the side plates into an elongate internal cooling water flow passage 95. The cooling water passages 95 in vanes 34 extend from inlets 96 formed at the forward ends of the vanes by slots extended through the hub 40A to register with the vane cooling water inlet gallery 83 and outlets 97 formed by slots in the hub 40A at the rear ends of the vanes to register with the water outlet gallery 89 through which water can flow from the vanes back through the water return passage 56 to the rear end of the central structure 33. Baffles 93, 94 are formed such that the water flow passages 95 extend from the inlets 96 backwardly along outer parts of the vanes to the rear end of the vanes then forwardly back to the forward end of the vanes before passing back along the inner parts of the vanes to the outlets 97. Thus incoming cooling water is directed firstly to the outer edges of the vanes which are most susceptible to excessive heating and degradation. The multi-pass flow passages 95 also ensure that all parts of the vanes are effectively cooled and stagnant water flow passages cannot develop.

The internally water cooled stainless steel swirl vanes are very robust and are able to withstand extremely high temperature conditions and abrasion from grit or other material carried by the hot gas blast within the lance. The vanes may be hard faced for maximum life.

Inner structure is provided with an external heat shield 120 formed of refractory material 92 encased within an outer casing 93 of high temperature resistant stainless steel to shield against heat transfer from the incoming hot gas flow in the duct 31 into the cooling water flowing within the central structure 33. The heat shield reduces heat transfer into the water flowing to the inner end of the central structure and the vanes and also insulates the returning water from the hot gas within the lance and hence minimise the load on cooling circuits for the cooling water.

The invention claimed is:

1. A vaned structure for a metallurgical vessel gas injection apparatus imposing swirl to a hot gas flow of 1100° C. to 1400° C., comprising a tubular hub and a plurality of vanes extending along the hub in a multi-start spiraling formation, wherein the vanes are formed with spaced apart side walls made of steel and with hollow interiors divided by interior baffles to form internal cooling water flow passages between the side walls and extending between inlets toward one end of the hub and outlets toward the other end of the hub wherein the baffles are elongated bars extending along the vanes between their forward and rear ends and dividing the interior of the vanes between the side walls to form the cooling water flow passages.

2. The vaned structure as claimed in claim 1, wherein the inlets and outlets are provided by slots extending radially through the hub.

3. The vaned structure as claimed in claim 1, wherein the cooling water flow passages in the vanes extend between their inlets and outlets in serpentine paths that define multiple passes between the front and rear ends of the vanes.

4. The vaned structure as claimed in claim 1, wherein the cooling water flow passages in the vanes extend from their inlets backwardly along outer parts of the vanes.

5. The vaned structure as claimed in claim 1, wherein the cooling water flow passages in the vanes extend from their inlets backwardly along outer parts of the vanes to the rear end of the vanes then forwardly to the forward ends of the vanes and thence along inner parts of the vanes to their outlets.

6. The vaned structure as claimed in claim 1, wherein the side walls of the vanes are steel plates.

7. The vaned structure as claimed in claim 1, wherein outer edges of the vanes are formed by capping bars connected between the side walls.

8. The vaned structure as claimed in claim 7, wherein the capping bars and baffle bars are welded to the side walls.

9. The vaned structure as claimed in claim 1, wherein the hub is water-cooled.

10. The vaned structure as claimed in claim 9, wherein the vanes communicate with a first cooling water supply passage and the hub communicates with a second, separate cooling water supply passage such that the vanes and the hub are cooled by separate cooling water supplies.

* * * * *